United States Patent [19]

Nomura et al.

[11] Patent Number: 4,990,554

[45] Date of Patent: Feb. 5, 1991

[54] POLYOLEFIN COMPOSITION

[75] Inventors: Manabu Nomura; Ryozo Tomomatsu; Toshifumi Shimazaki, all of Ichihara, Japan

[73] Assignee: Idemitsu Petrochemical Company Limited, Tokyo, Japan

[21] Appl. No.: 355,604

[22] Filed: May 23, 1989

Related U.S. Application Data

[63] Continuation-in-part of Ser. No. 128,747, Dec. 4, 1987, abandoned, which is a continuation-in-part of Ser. No. 869,785, Jun. 2, 1986, abandoned.

[30] Foreign Application Priority Data

Jun. 6, 1985 [JP] Japan .................................. 60-123311

[51] Int. Cl.$^5$ ........................ C08K 7/04; C08L 23/12; C08L 23/14
[52] U.S. Cl. .................................... 524/423; 524/413; 524/436; 524/443; 524/456; 524/504; 524/528; 525/74; 525/240
[58] Field of Search ............... 524/504, 523, 413, 423, 524/436, 443, 456; 525/74, 240

[56] References Cited

U.S. PATENT DOCUMENTS 4,312,964 1/1982 Sekine ................................. 525/240

FOREIGN PATENT DOCUMENTS 206447 11/1984 Japan .
61-72040 4/1986 Japan .
61-179248 8/1986 Japan .

Primary Examiner—Lewis T. Jacobs
Assistant Examiner—David Buttner
Attorney, Agent, or Firm—Armstrong, Nikaido, Marmelstein, Kubovcik & Murray

[57] ABSTRACT

A polyolefin composition is disclosed, which comprises a polyolefin and an inorganic filler, wherein the polyolefin composition comprising (A) 75 to 97% by weight of a polyolefin component comprising (a) 90–65 parts by weight of a polymer composition comprising a crystalline polypropylene component and an ethylene-propylene random copolymer component and having an ethylene content of 7% by weight or less and/or a propylene homopolymer and (b) 10 to 35 parts by weight of a polyethylene having a melt index of not lower than 10 g/10 min., said melt index being from 1.0 to 50 times that of the polymer (a), and (B) 25 to 3% by weight of a fibrous inorganic filler having an average fiber diameter of 0.1 to 0.8 micrometer and an aspect ratio of 20 to 60.

The polyolefin composition is capable of providing, upon molding, articles having good surface appearance, in particular glossiness and improved mechanical strengths with less warping and deformation.

10 Claims, No Drawings

POLYOLEFIN COMPOSITION

This application is a continuation-in-part of application Ser. No. 128,747, filed Dec. 4, 1987 now abandoned, which in turn is a continuation-in-part of application Ser. No. 869,785, filed June 2, 1986 and now abandoned.

The present invention relates to a polyolefin composition comprising a specified kind of polyolefin reinforced with a fibrous inorganic filler having a specified characteristics.

BACKGROUND OF THE INVENTION

Polyolefin compositions filled with an inorganic filler generally have a slightly reduced impact strength but have a high stiffness. Those compositions filled with a fibery inorganic filler represented by glass fiber have a highly improved strength such as tensile strength and flexural strength as well as highly improved stiffness. Therefore, such polypropylene compositions are widely used as an industrial material.

The present inventors have already proposed a polyolefin resin composition, characterized by containing 40-94% by weight of a propylene-ethylene copolymer of 7-30% by weight in ethylene content and 8-40% by weight of precipitate of in methanol, 3-20% by weight of polyethylene and 3-40% by weight of a fibrous filler having an average fiber diameter of 0.1-2 μm and an aspect ratio of 20-60 (cf. Japanese Patent Application No. 194293/84, Japanese Unexamined Publication (Kokai) No. 72040/86) and have found that this polyolefin resin composition is high in stiffness and impact strength (cf. Japanese Patent Application No. 194293/84). This composition is useful as a material for use in automobiles and ordinary electric equipments since it has a high stiffness and impact strength. However, it is not satisfactory as a material for a housing of television set and refrigerator, a fender of automobile and the like which are required to have a glossiness, and therefore improvement has been desired.

Further, the present inventors have found that a resin composition comprising a blend of a polypropylene and a polyethylene of which the ratio of melt index of the polypropylene to that of the polyethylene is in a predetermined range, and nonfibrous inorganic filler is highly glossy and has a high stiffness and impact strength (Japanese Patent Application No. 18645/85).

However, since the inorganic filler contained in the above composition is not fibrous, the resin composition is poor in glossiness and stiffness as compared with ABS resin. Further, it is unsatisfactory in the appearance of weld and in mechanical stength. When a pigment is added to the resin composition, the resulting composition is in short of color developing property and brightness.

Materials for producing housings and fenders having a stiffness and glossiness as high as possible are desirable, and it has been desired to develop a resin composition which can be molded into an article having an excellent stiffness and glossiness as compared with that described in Japanese Patent Application No. 18645/85 and comparable to ABS resin.

SUMMARY OF THE INVENTION

An object of the present invention is to provide a polyolefin composition which can give a molded article having a good surface appearance, especially surface glossiness and an improved mechanical strength and surface hardness as well as high stiffness and suffering less warping and deformation.

Another object of the present invention is to provide a polyolefin composition which can give a molded article having a very excellent glossiness and yet maintaining a mechanical strength as high as or higher than that composed of conventional resin composition even when the article is of a small thickness.

As result of extensive reseach on the development of polyolefin compositions suitable for a material for use in the field of, for example, automobiles, domestic electric appliances, office automation devices and the like, the present inventors have now found that a polyolefin composition which can be molded into an article having an excellent glossiness and a high mechanical strength such as impact strength as well as having a high stiffness, surface hardness and anti-thermal stiffness is obtained by blending a specified ethylene-propylene copolymer and/or polypropylene, a specified polyethylene and a specified fibrous inorganic filler in a specified ratio.

The present invention is based on the above-described discovery, and provides a polyolefin composition comprising (a) 90-65 parts by weight of a polymer composition comprising a crystalline polypropylene component and an ethylene-propylene random copolymer component and having an ethylene content of 7% by weight or less and/or a propylene homopolymer and (b) 10 to 35 parts by weight of a polyethylene having a melt index of not lower than 10 g/10 min., said melt index being from 1.0 to 50 times as high as that of the polymer (a), and (B) 25 to 3% by weight of a fibrous inorganic filler having an average fiber diameter of 0.1 to 0.8 micrometer and an aspect ratio of 20 to 60.

DETAILED DESCRIPTION OF THE INVENTION

The component (a) in the present invention is a polymer composition comprising a crystalline polypropylene component and an ethylene-propylene random copolymer and having an ethylene content of not more than 7% by weight or a propylene homopolymer.

The crystalline polypropylene in the polymer composition which is said component (a) is a propylene homopolymer obtained by polymerizing propylene using a stereoregular catalyst or a substantial propylene homopolymer containing not more than 2% by weight of ethylene unit or other olefin unit and this is that generally used as molding materials.

Said ethylene-propylene random copolymer is an ethylene-propylene random copolymer containing 20-80% by weight of ethylene unit which is obtained by polymerizing ethylene and propylene or these and a small amount of other olefins using a stereoregular catalyst or the like or so-called substantial ethylene-propylene random copolymer containing a small amount of other olefin unit. These copolymer may contain small amount of ethylene homopolymer which is produced at the time of copolymerization.

As the other olefins referred to above, mention may be made of α-olefins such as 1-butene, 1-pentene, 1-hexene, 1-heptene, isobutene and 4-methylpentene-1.

The polymer composition which is the component (a) may be obtained by blending the crystalline polypropylene component and the ethylene-propylene random copolymer which have been separately prepared, but preferably is a polymer composition which is obtained by so-called two-stage or multi-stage polymerization which comprises a first stage where the crystalline polypropylene is prepared by polymerizing propylene in the presence of a stereoregular catalyst and a second stage where ethylene and propylene are copolymerized in the presence of the crystalline polypropylene obtained at the first stage with a stereoregular catalyst with or without removing unreacted propylene used at the first stage.

Pressure at each stage may be several atm—40 atm and temperature may be room temperature—80° C. and solution polymerization, slurry polymerization, vapor phase polymerization or combination thereof may be used.

Ethylene content in this polymer composition can be adjusted, for example, by selecting composition of starting monomers, charging amounts and polymerization conditions at each stage of two-stage or multi-stage polymerization.

It is important in the present invention that the ethylene content in the polymer composition which is the component (a) is not more than 7% by weight. When a polymer composition having an ethylene content of more than 7% by weight is used, glossiness of the obtained molded products is less than 80% and thus improvement in gloss is poor and besides stiffness is normally less than 20,000 kg/cm$^2$, which are not preferred.

Such component (a), which can be obtained by that two-stage or multi-stage polymerization, is commercially available under trade names of "Idemitsu Polypro 785H", "Idemitsu Polypro J3050H", etc.

As the propylene homopolymer which is used as the component (a) in place of said polymer composition or used together with said polymer composition, there may be used, for example, a polypropylene obtained by polymerizing propylene with a known stereoregular catalyst or a ethylene-propylene copolymer in which ethylene content is substantially zero. This propylene homopolymer is one which is generally used as molding materials.

As for the component (b), high density polyethylene, low desity polyethylene, linear polyethylene, branched chain polethylene, such as ethylene-butene-1 copolymer, graft polyethylene etc. can be used which have a melt index of not lower than 10 g/10 min., preferably not lower than 15 g/10 min., the melt index being from 1.0 to 50 times, preferably from 1.5 to 20 times, as high as that of the polymer defined as component (a).

When the polyethylene as the component (b) has melt index of lower than 10 g/10 min., improvement in glossiness of molded article is undesirably low. The polyethylene having a melt index lower than that of the component (a) is not suitable for the component (b) since it exhibits only a slight improvement in glossiness. On the other hand, when the melt index of the component (b) exceeds 50 times as high as that of the component (a), decrease in the impact strength and glossiness of molded article occurs.

The polyethylene which can be used inthe present invention as the component (b) can be prepared in a conventional manner.

In the present invention, the components (a) and (b) are blended in a ratio of 90 to 65 parts by weight of the component (a) to 10 to 35 parts by weight of the component (b), preferably, 85–70 parts by weight of the component (a) to 15 to 30 parts by weight of the component (b). When the amount of the component (a) exceeds 90 parts by weight, that is, the amount of the component (b) is below 10 parts by weight, the surface glossiness of molded articles tends to decrease undesirably. On the other hand, when the component (a) is contained in an amount of below 65 parts by weight, that is, when the component (b) is contained in an amount of above 35 parts by weight, molded articles tend to have a decreased anti-thermal stiffness, surface hardness or stiffness.

In the present invention, the polyolefin component (A) is blended with a fibrous inorganic filler having an average fiber diameter of 0.1 to 0.8 micrometer and an aspect ratio of 20 to 60, preferably 30 to 50. When the average fiber diameter of the component (B) is below 0.1 micrometer, various problems tend to arise in that not only dispersion of the components takes place only sufficiently, resulting in the occurrence of agglomerates on the surface but also the bulk specific density of the resin composition is too low to carry out compounding. On the other hand, if the average fiber diameter exceeds 0.8 $\mu$m, the resin composition is inferior in Izot impact strength and elastic modulus in bending and poor in balance of properties. Furthermore, the average fiber diameter exceeding 0.8 $\mu$m and the aspect ratio exceeding 60 may provided a molded article having a bad surface appearance. To the contrary, the average fiber diameter exceeding 0.8 $\mu$m and the aspect ratio of less than 20 may unpreferably produce such problems that the stiffness is not highly improved and so on.

Any inorganic substance can be used as the component (B) as far as it meets the conditions as specified above. There can be used various fibers or fibrous substances such as a magnesium oxide fiber, a fibrous magnesium oxysulfate, a magnesium hydroxide fiber, a gypsum fiber, a potassium titanate fiber, a glass fiber, a calcium silicate fiber, a carbon fiber, a rock wool, a silicon azide whisker, a silicon carbide whisker, a ceramic fiber which is an alumina-silica based glass fiber, etc. Of these fibrous inorganic fibers, a fibrous magnesium oxysulfate, a magnesium hydroxide fiber and a gypsum fiber are preferred.

In the polyolefin composition of the present invention, the polyoleifn component (A) and the fibrous inorganic filler (B) are used in such a ratio that 75 to 97% by weight of the component (A) is blended with 25 to 3% by weight of the component (B), preferably 80 to 95% by weight of the component (A) is blended with 20 to 5% by weight of the component (B). When the component (A) is contained in an amount above 97% by weight, that is, the amount of the component (B) is below 3% by weight, only a slight improvement in stiffness of molded articles is obtained. On the other hand, when the amount of the component (A) is below 75% by weight, that is, the amount of the component (B) is above 25% by weight, molded articles are unsatisfactory since they have not only a glossiness of below 80% but also a decreased impact strength.

The component (a) and (b) described above are blended in a ratio within the above-described range and kneaded sufficiently by a dry mixing-melt mixing combination method, a multi-stage melt mixing method, a simple melt mixing method or a like method to prepare a polyolefin component (A). Further, the components (a) and (b) and the component (B) described above are blended, melted and kneaded to prepare a polyolefin composition of the present invention.

Kneading can be carried out using a Banbury mixer, a co-kneader, an extruder a biaxial kneader and the like.

Since the polyolefin resin composition of the present invention comprises, at a specific blending ratio, (A) a specific polyolefin composition containing (a) a specific polymer composition comprising a crystalline polypropylene component and an ethylene-propylene random copolymer component and having an ethylene content e more than 7% by weight or a propylene homopolymer and (b) 10–35 parts by weight of a specific polyethylene and (B) a specific fibrous inorganic filler, the polyolefin composition of the present invention not only has improved mechanical strengths such as impact strength, anti-thermal stiffness, surface hardness and stiffness but also is capable of providing molded articles having an excellent surface appearance and also suffering less warpage and deformation. In order to further improve the strength of molded articles composed of the polyolefin composition of the present invention, a silane based coupling agent and/or modified polyolefin can be added to the polyolefin composition. The silane based coupling agent or the modified polyolefin alone, or alternatively, both of them can be added to the polyolefin composition.

Suitable examples of the silane based coupling agent include vinyltriethoxysilane, vinyltrimethoxysilane, vinyltrichloro-silane, vinyldichloro-ehtylsilane, vinylchlorodiethylsilane, vinyltris($\beta$-methyoxyethoxysilane), $\gamma$-glycidoxypropyltrimethoxysilane, $\gamma$-glycidoxypropyltrimethoxysilane, $\gamma$-amino-propyltriethoxysilane, N-$\beta$-(aminoethyl)-$\gamma$-aminopropyltriethoxysilane, and N-$\beta$-(aminoethyl)-$\gamma$-aminopropylmethyldiethoxysilane.

Preferably, the silane based coupling agent can be added in an amount of 0.1 to 3 parts by weight per 100 parts by weight of the sum of the polyolefin component (A) and the fibery inorganic filler (B).

When the amount of the silane based coupling agent is below 0.1 part by weight, substantially no improvement in the mechanical strength of molded articles tend to be observed by the addition of the coupling agent. On the other hand, when the amount of the coupling agent exceeds 3 parts by weight, increase in the mechanical strength of molded articles is saturated. Therefore, it is disadvantageous from economic viewpoint to add the silane based coupling agent in an amount of above 3 parts by weight.

Suitable examples of the modified polyolefin include polyethylenes, polypropylenes and ethylene-propylene copolymers each modified with unsaturated carboxylic acids, unsaturated carboxylic acid derivatives, chlorine or vinylsilane. Examples of the unsaturated carboxylic acids which can be used in the modification include acrylic acid, methacrylic acid, maleic acid, fumaric acid, itaconic acid, crotonic acid, citraconic acid, sorbic acid, measaconic acid, angelic acid, etc.

As for the unsaturated carboxylic acid derivative, there can be used acid anhydrides, esters, amides, imides, and metal salts derived from unsaturated carboxylic acids. Specific examples thereof include maleic anhydride, itaconic anhydride, citraconic anhydride, methyl acrylate, methyl methacrylate, ethyl acrylate, butyl acrylate, maleic acid monoethyl ester, acrylamide, maleic acid monoamide, maleimide, N-butylamleimide, sodium acrylate, sodium methacrylate, etc.

Of the various types of modified polyolefins, polypropylenes modified with maleic anhydride are preferred.

It is preferred to add the modified polyolefin in an amount of 0.1 to 5 parts by weight per 100 parts by weight of the total of the polyolefin component (A) and the fibery inorganic filler (B). When the amount of the modified polyolefin is below 0.1 part by weight, the mechanical strength of molded articles composed of the polyolefin composition sometimes fail to exhibit a sufficient increase. On the other hand, when the amount of the modified polyolefin is above 5 parts by weight, the mechanical strengths of molded articles do not increase correspondingly as the increase in the amount of the modified polyolefin, and the larger that amount is the more expensive and disadvantageous molded articles are.

The polyolefin composition of the present invention can contain various types of additives such as an antioxidant, an antistatic agent, an ultraviolet light absorbent, a lubricant, a flame retardant, mould release agent, a coloring agent and the like, if desired.

Suitable examples of the anitioxidant include phenol compounds such as 2,6-di-t-butyl-p-cresol, butylated hydroxyanisole, 2,6-di-butyl-4-ethylphenol, steary-$\beta$-(3,5-di-t-butyl-4-hydroxyphenyl)propionate, 2,2-methylenebis(4-methyl-6-t-butylphenyl), 2,2-methylenbis(4-ethyl-6-t-butylphenol), 4,4-thiobis(3-methyl-6-t-butylphenol), 4,4-butylidenebis(3-methyl-6-t-butylphenol), tetrakis(methylene-3-(3,5-di-t-butyl-4-hydroxyphenyl)propionate)methane, 1,1,3-tris(2-methyl-4-hydroxy-5-t-butylphenyl)butane, etc., amine compounds such as phenyl-$\beta$-naphthylamine, N,N-diphenyl-p-phenylenediamine, etc., phosphor compounds such as tris(nonylphenyl) phosphite, triphenyl phosphite, trioctadecyl phosphite, diphenyl isodecyl phosphite, etc., sulfur compounds such as dilaurylthiodipropionate, dimyristylthiodipropionate, distearylthiodipropionate, etc., and the like.

Suitable example of the antistatic agent include nonionic antistatic agents such as polyoxyethylene alkylamines, polyoxyethylene alkylamides, etc., anionic antistatic agents such as alkyl sulfonates, alkyl benzenesulfonates, etc., cationic antistatic agents such as quaternary ammonium chloride, quaternary ammonium sulfate, etc., amphoteric antistatic agents such as alkylbetains, alkylimidazolines, etc.

Suitable examples of the ultraviolet light absorbent include salicyclic acid based ultraviolet light absorbents such as phenyl salicylate, p-t-butylphenyl salicylate, etc., benzophenone based ultraviolet light absorbents such as 2,4-dihydroxybenzophenone, 2-hydroxy-4-methoxybenzophenone, etc., benzotriazole based ultraviolet light absorbents such as 2-(2-hydroxy-5-methylphenyl)benzotriazole, 2-(2-hydroxy-5-t-butylphenyl)-benzotiazole, etc.

As for the lubricant, aliphatic hydrocarbons, higher aliphatic alcohols, fatty acid amides, metal soaps, fatty acid esters, etc. can be used.

Suitable examples of the flame retardant include halogen-containing flame retardants such as polytribromostylene, decabromodiphenyl ether, tetrabromobisphenol A, etc., phosphor based flame retardants such as ammonium phosphate, tricresyl phosphate, triethyl phosphate, acid phosphate, etc., inorganic flame retardants such as tin oxide, antimony trioxide, etc. and the like.

Suitable examples of the mould release agent include carnauba wax, paraffin wax, silicone oil, etc.

As for the coloring agent, ordinary coloring agents which are used for coloring plastics can be used.

Further, the polyolefin composition of the present invention can contain an elastomer as far as it does not adversely affect the stiffness of the resulting molded articles, and also the polyolefin composition can contain a non-fibery inorganic filler such as talc, calcium carbonate, mica, etc. as far as the glossiness of the resulting molded articles is not decreased.

The polyolefin composition of the present invention can be molded into articles of desired shape by means of injection molding, extrusion molding, etc.

The polyolefin composition of the present invention can upon molding give rise to articles not only having an excellent surface glossiness but also having improved stiffness, impact strength, anti-thermal stiffness, surface hardness and the like, and as a result molded articles which are small in thickness and light in weight can be obtained without sacrificing the mechanical strengths thereof.

Therefore, the polyolefin composition of the present invention is very useful as a material for use in domestic electric appliances, office automation devices, materials for automobiles, etc.

With the polyolefin composition of the present invention, molded articles can be obtained which not only have excellent surface appearance and gloss but also have improved mechanical strengths such as impact strength as well as increase in stiffness, anti-thermal stiffness and surface handness with less warpage and deformation, resulting in that they can be small in thickness and light in weight.

More particularly, molded articles obtained by molding the polyolefin composition of the present invention have a glossiness of 80% or more and a stiffness of 20,000 kg/cm$^2$ or more.

These characteristics of the polyolefin composition of the present invention have not been attained before a resin composition comprising a specific polymer composition having a specified ethylene content and/or propylene homopolymer and a polyethylene having a specified melt index ratio in a specified blend ratio.

The present invention will be explained in more detail with reference to examples and comparative examples, However, the present invention is not to be construed as being limited to these examples.

EXAMPLES 1 to 11

Polymer composition which is the component (a) or polypropylene shown in Table 1, polyethylene shown in Table 1, and fibrous inorganic filler shown in Table 1 were mixed well in a V-type blender and melt-mixed using a biaxial kneader to form pellets, and the pellets were injection molded at 200° C. to prepare test pieces. These test pieces were subjected to determination of the following properties.

Izod Impact Strength

This was determined according to the method described in JIS K7110.

Glossiness

This was determined according to the method described in JIS K7105.

Elastic Modulus in Bending

This was determined according to the method described in JIS K7203.

Thermal Deformation Temperature

This was determined according to the method described in JIS K7207.

Rockwell Hardness

This was determined according to the method described in JIS K7207.

The results obtained are shown in Table 1.

Melt Index (MI)

This was determined according to the method described in JIS K7210.

COMPARATIVE EXAMPLES 1 to 17

Test pieces were prepared in the same manner as in Examples 1 to 11 except that the ethylene-propylene copolymer, polyethylene and fibery inorganic filler for Examples 1 to 11 were replaced by those for Comparative examples 1 to 17 shown in Table 1. The test pieces thus-obtained were subjected to determination of various properties in the same manner as in Examples 1 to 11.

The results obtained are shown in table 1.

The following can be recognized form the results shown in Table 1.

The polyolefin resin composition of Comparative Example 7 (which was outside the present invention because ethylene content in the polymer composition of the component (a) was too high) had a glossiness of lower than 80%, an elastic modulus in bending of lower than 20,000 kg/cm$^2$ and a thermal deformation temperature and a Rockwell hardness lower than those in Examples 1–4.

The polyolefin resin composition of Comparative Example 12 (which was outside the present invention because amount of the polymer composition of the component (a) was too small and amount of polyethylene of the component (b) was too much) were inferior to the polyolefin resin compositions of all examples in elastic modulus in bending, thermal deformation temperature and Rockwell hardness.

The polyolefin resin composition of Comparative Example 13 (which was outside the present invention because amount of the component (a) was too much and that of the component (b) was too small) was poor in gloss and low in Izod impact strength.

The polyolefin resin composition of Comparative Example 1 (which was outside the present invention because melt index of the component (b) was too small) was poor in gloss and low in Rockwell hardness.

The polyolefin resin composition of Comparative Example 2 (which was outside the present invention because polyethylene having a melt flow index smaller than that of component (b) was used) was inferior to those of Examples 1–4 in gloss and Izod impact strength.

The polyolefin resin composition of Comparative Example 16 (the melt flow index of component (b) exceeds 50 times as high as that of the component (a)) is very poor in surface glossiness and low in Rockwell hardness.

The polyolefin resin composition of Comparative Example 17 (the melt flow index of the component (a) is identical with that in Examples 1 to 3, 5, 9 and 10 but, on the other hand, the melt flow index of the component (b) is so very high as 500 or higher and thus exceeds 50 times as high as that of the component (a)) is poor in any of glossiness, Izot impact strength, elastic modulus in bending, thermal deformation temperature and Rockwell hardness.

From Comparative Examples 16 and 17 it is clear that the relationship between the melt flow index of the component (a) and the melt flow index of the component (b) is critical and it cannot be said that the higher the melt flow index of the component (b), the better the polyolefin resin composition becomes. Particularly, it should be noted that the polyolefin resin composition of Comparative Example 17 is interior in its properties to that of Example 1 wherein the melt flow index of the component (b) is relatively low.

The polyolefin resin composition of Comparative Example 3 (which was outside the present invention because amount of polyolefin composition (A) comprising components (a) and (b) was too much) was inferior to those of Examples 1–4 in elastic modulus in bending, thermal deformation temperature and Rockwell hardness.

The polyolefin resin composition of Comparative Example 4 (which was outside the present invention because average fiber diameter and aspect ratio of the fibrous inorganic filler were greater than the ranges specified in the present invention) was inferior to those of Examples 1–4 in gloss and Izod impact strength.

The polyolefin resin composition of Comparative Example 5 (which was outside the present invention because the aspect ratio of inorganic filler was too small and the average fiber diameter of that was greater) was inferior to those of Examples 1-2 in gloss, elastic modulus in bending, thermal deformation temperature and Rockell hardness.

The polyolefin resin composition of Comparative Example 6 (which was outside the present invention because non-fibrous filler was used) was inferior in gloss, elastic modulus in bending, thermal deformation temperature and Rockwell hardness.

The polyolefin resin compositions of Comparative Examples 8, 9 and 15 (the average fiber diameter of the fibrous inorganic filler is outside the range of the present invention) are inferior in glossiness and balance of mechanical properties.

The polyolefin resin composition of Comparative Example 10 (wherein mica which is non-fibrous inorganic filler was used) was inferior in gloss, Izod impact strength, thermal deformation temperature and Rockwell hardness.

The polyolefin resin composition of Comparative Example 11 (wherein fibrous inorganic filler having an aspect ratio smaller than that of the present invention was used) was inferior in elastic modulus in bending and thermal deformation temperature.

With reference Comparative Example 14, polyolefin resin composition which contained no polyethylene was inferior in gloss and Izod impact strength.

It is recognized that a high surface gloss as of ABS can be attained by blending a polymer of not more than 7% by weight in ethylene content and/or a propylene homopolymer with a polyethylene having a specific melt index and good in flowability, but stiffness is still insufficient.

Then, use of inorganic fillers can be considered, but conventional inorganic fillers must be used in a large amount in order to enhance the stiffness to more than 20,000 kg/cm$^2$ and this results in considerable deterioration of gloss.

In order to solve such defects, the present invention has been made. That is, these problems have been solved by using a fibrous inorganic filler having specific fiber diameter and aspect ratio.

As will be apparent from the results shown in Table 1, the test pieces, which are composed of the polyolefin composition comprising (A) 75 to 97% by weight of a polyolefin component comprising (a) 90to 65 parts by weight of a polymer composition having an ethylene content of not more than 7% by weight and/or polypropylene and (b) 10 to 35 parts by weight of a polyethylene having a melt index of not lower than 10 g/10 min., said melt index being from 1.0 to 50 times as high as that of the polymer (a), and (B) 25 to 3% by weight of a fibrous inorganic filler having an average fiber diameter of 0.1 to 0.8 micrometer and an aspect ratio of 20 to 60, has a high Izod impact strength, flexural modulus of elasticity, thermal deformation temperature, Rockwell hardness, glossiness, etc.

Although the present invention has been described with preferred embodiments, it is to be understood that variations and modifications may be employed as will be apparent to those skilled in the art. Such variations and modifications are to be considered with in the purview and scope of the claims appended hereto.

TABLE 1

| | (a) Polypropylene | | | (b) Polyethylene | | | (A) | | (B) Fibery Inorganic Filler | | | |
|---|---|---|---|---|---|---|---|---|---|---|---|---|
| | Kind | Ethylene Content | Wt Parts | Kind | MI | Wt Parts | Polyolefin MI(PE)/MI(PP) | Wt % | Kind | Fiber Diameter | Aspect Ratio | Wt % |
| Ex. 1 | *1 | 4 wt % | 78 | *6 | 18 | 22 | 2.3 | 90 | *11 | 0.8 μm | 40 | 10 |
| Ex. 2 | *1 | 4 wt % | 78 | *7 | 40 | 22 | 5.0 | 90 | *11 | 0.8 μm | 40 | 10 |
| Ex. 3 | *1 | 4 wt % | 78 | *7 | 40 | 22 | 5.0 | 90 | *15 | 0.3 μm | 40 | 10 |
| Ex. 4 | *3 | 4 wt % | 78 | *8 | 132 | 22 | 16.5 | 90 | *11 | 0.8 μm | 40 | 10 |
| Co. Ex. 1 | *1 | 4 wt % | 78 | *9 | 0.2 | 22 | 0.025 | 90 | *11 | 0.8 μm | 40 | 10 |
| Co. Ex. 2 | *3 | 4 wt % | 78 | *10 | 13 | 22 | 0.43 | 90 | *11 | 0.8 μm | 40 | 10 |
| Co. Ex. 3 | *1 | 4 wt % | 78 | *7 | 40 | 22 | 5.0 | 98 | *11 | 0.8 μm | 40 | 2 |
| Co. Ex. 4 | *1 | 4 wt % | 78 | *7 | 40 | 22 | 5.0 | 90 | *20 | 13 μm | 250 | 10 |
| Co. Ex. 5 | *1 | 4 wt % | 78 | *7 | 40 | 22 | 5.0 | 90 | *21 | 2.0 μm | 10 | 10 |
| Co. Ex. 6 | *1 | 4 wt % | 78 | *7 | 40 | 22 | 5.0 | 90 | talc | Average Particle Size 7 μm | | 10 |
| Co. Ex. 7 | *5 | 11.1 wt % | 78 | *7 | 40 | 22 | 2.0 | 90 | *11 | 0.8 μm | 40 | 10 |
| Ex. 5 | *1 | 4 wt % | 81 | *7 | 40 | 19 | 5.0 | 80 | *11 | 0.8 μm | 40 | 20 |
| Ex. 6 | *4 | 6.1 wt % | 81 | *8 | 132 | 19 | 44.0 | 85 | *18 | 0.3 μm | 60 | 15 |
| Co. Ex. 8 | *1 | 4 wt % | 81 | *7 | 40 | 19 | 5.0 | 80 | *22 | 4.0 μm | 30 | 20 |
| Co. Ex. 9 | *1 | 4 wt % | 81 | *7 | 40 | 19 | 5.0 | 80 | *23 | 13 μm | 5 | 20 |
| Ex. 7 | *2 | 0 wt % | 74 | *7 | 40 | 26 | 2.0 | 95 | *12 | 0.5 μm | 30 | 5 |
| Ex. 8 | *4 | 6.1 wt % | 74 | *8 | 132 | 26 | 6.0 | 85 | *19 | 0.8 μm | 40 | 15 |
| Co. Ex. 10 | *2 | 0 wt % | 74 | *7 | 40 | 26 | 2.0 | 95 | mica | Average Particle Size 75 μm | | 5 |
| Co. Ex. 11 | *1 | 4 wt % | 74 | *6 | 18 | 26 | 2.3 | 85 | *24 | 0.8 μm | 5 | 15 |

TABLE 1-continued

| | | | | | | | | | | | | |
|---|---|---|---|---|---|---|---|---|---|---|---|---|
| Ex. 9 | *1 | 4 wt % | 70 | *7 | 40 | 30 | 5.0 | 80 | *14 | 0.2 μm | 50 | 20 |
| Ex. 10 | *1 | 4 wt % | 85 | *7 | 40 | 15 | 5.0 | 90 | *13 | 0.4 μm | 40 | 10 |
| Ex. 11 | *4 | 6.1 wt % | 85 | *7 | 40 | 15 | 13.3 | 95 | *17 | 0.3 μm | 60 | 5 |
| Co. Ex. 12 | *1 | 4 wt % | 44 | *6 | 18 | 56 | 2.3 | 90 | *11 | 0.8 μm | 40 | 10 |
| Co. Ex. 13 | *1 | 4 wt % | 95 | *6 | 18 | 5 | 2.3 | 90 | *11 | 0.8 μm | 40 | 10 |
| Co. Ex. 14 | *1 | 4 wt % | 100 | — | — | — | — | 90 | *11 | 0.8 μm | 40 | 10 |
| Co. Ex. 15 | *1 | 4 wt % | 81 | *8 | 132 | 19 | 16.5 | 90 | *16 | 1.0 μm | 50 | 10 |
| Co. Ex. 16 | *25 | 4.5 wt % | 78 | *8 | 132 | 22 | 132 | 90 | *11 | 0.8 μm | 40 | 10 |
| Co. Ex. 17 | *1 | 4 wt % | 78 | *26 | more than 500 | 22 | more than 62.5 | 90 | *11 | 0.8 μm | 40 | 10 |

| | Glossiness (%) | Izod Impact Strength (Notched) (kg · cm/cm) | Flexural Modulus of Elasticity (kg/cm) | Thermal Deformation Temperature (°C.) | Rockwell Hardness (R scale) |
|---|---|---|---|---|---|
| Ex. 1 | 83 | 11.7 | 25800 | 129 | 86 |
| Ex. 2 | 86 | 38.6 | 23600 | 124 | 80 |
| Ex. 3 | 83 | 24.9 | 21900 | 122 | 79 |
| Ex. 4 | 85 | 14.5 | 26600 | 128 | 82 |
| Co. Ex. 1 | 51 | 14.8 | 24400 | 127 | 78 |
| Co. Ex. 2 | 68 | 6.7 | 21700 | 129 | 83 |
| Co. Ex. 3 | 85 | 27.9 | 14600 | 91 | 62 |
| Co. Ex. 4 | coarse surface | 5.9 | 23700 | 138 | 90 |
| Co. Ex. 5 | 72 | 12.7 | 16200 | 93 | 72 |
| Co. Ex. 6 | 68 | 13.1 | 17200 | 110 | 74 |
| Co. Ex. 7 | 72 | 60.5 | 18700 | 112 | 76 |
| Ex. 5 | 80 | 21.8 | 37500 | 135 | 88 |
| Ex. 6 | 88 | 26.2 | 25700 | 121 | 83 |
| Co. Ex. 8 | coarse surface | 6.9 | 24100 | 119 | 76 |
| Co. Ex. 9 | 71 | 5.4 | 20300 | 113 | 75 |
| Ex. 7 | 88 | 9.4 | 20200 | 111 | 81 |
| Ex. 8 | 84 | 30.7 | 24200 | 117 | 80 |
| Co. Ex. 10 | 58 | 8.2 | 16100 | 108 | 70 |
| Co. Ex. 11 | 89 | 40.1 | 16200 | 107 | 73 |
| Ex. 9 | 89 | 38.2 | 28200 | 125 | 80 |
| Ex. 10 | 82 | 22.7 | 25200 | 127 | 83 |
| Ex. 11 | 81 | 29.4 | 20400 | 118 | 82 |
| Co. Ex. 12 | 87 | not destroyed | 16800 | 72 | 52 |
| Co. Ex. 13 | 46 | 6.2 | 26700 | 132 | 91 |
| Co. Ex. 14 | 70 | 7.1 | 30700 | 130 | 92 |
| Co. Ex. 15 | 86 | 14.2 | 20100 | 125 | 85 |
| Co. Ex. 16 | 71 (Flow Mark occured) | 28.2 | 22200 | 111 | 76 |
| Co. Ex. 17 | 76 | 4.9 | 19800 | 94 | 73 |

*1 Propylene-ethylene copolymer (ethylene content: 4 wt %, MI 8 g/10 min.; "Idemitsu Polypro J785H" produced by Idemitsu Petro-Chemical Co., Ltd.)
*2 Propylene homopolymer (MI: 20 g/10 min. ("Idemitsu Polypro J2000G" produced by Idemitsu Petro-Chemical Co., Ltd.)
*3 Propylene-ethylene copolymer (ethylene content: 4 wt %, MI: 30 g/10 min.; "Idemitsu Polypro J3050H" produced by Idemitsu Petro-Chemical Co., Ltd.)
*4 Propylene-ethylene copolymer (ethylene content: 6.1 wt %, MI: 3 g/10 min.; "Idemitsu Polypro J450H" produced by Idemitsu Petro-Chemical Co., Ltd.)
*5 Propylene-ethylene copolymer (ethylene content: 11.1 wt %, MI: 2 g/10 min.; "Idemitsu Polypro J465H" produced by Idemitsu Petro-Chemical Co., Ltd.)
*6 High density polyethylene (MI: 18 g/10 min., density: 0.965 g/cm$^3$; "Idemitsu Polyethy 130J" produced by Idemitsu Petro-Chemical Co., Ltd.)
*7 Ethylene-Butene-1 copolymer (MI: 40 g/10 min., density: 0.935 g/cm$^3$; "Stamilex 4408" produced by DSM Co.)
*8 High density polyethylene (MI: 132 g/10 min., density: 0.957 g/cm$^3$; "SCLAIR 2818" produced by Du Pon't Canada Co.)
*9 High density polyethylene (MI: 0.2 g/10 min., density: 0.950 g/cm$^3$; "Idemitsu Polyethy 550P" produced by Idemitsu Petro-Chemical Co., Ltd.)
*10 High density polyethylene (MI: 13 g/10 min., density: 0.965 g/cm$^3$; "Idemitsu Polyethy 110J" produced by Idemitsu Petro-Chemical Co., Ltd.)
*11 Fibery magnesium oxysulfate (fiber diameter: 0.8 μm, aspect ratio: 40)
*12 Magnesium hydroxide fiber (fiber diameter: 0.5 μm, aspect ratio: 30)
*13 Magnesium oxide fiber (fiber diameter: 0.4 μm, aspect ratio: 40)
*14 Gypsum fiber (fiber diameter: 0.2 μm, aspect ratio: 50)
*15 Potassium titanate fiber (fiber diameter: 0.3 μm, aspect ratio: 40)
*16 Glass fiber (fiber diameter: 1.0 μm, aspect ratio: 50)
*17 Carbon fiber (fiber diameter: 0.9 μm, aspect ratio: 40)
*18 Silicon azide fiber (fiber diameter: 0.3 μm, aspect ratio: 60)
*19 Silicon carbide fiber (fiber diameter: 0.8 μm, aspect ratio: 40)
*20 Glass fiber (fiber diameter: 13 μm, aspect ratio: 250)
*21 Calcium silicate fiber (fiber diameter: 4 μm, aspect ratio: 10)
*22 Gypsum fiber (fiber diameter: 4 μm, aspect ratio: 30)
*23 Milled fiber (fiber diameter: 13 μm, aspect ratio: 5)
*24 Fibery magnesium oxysulfate (fiber diameter: 0.8 μm, aspect ratio: 5)
*25 Propylene-ethylene copolymer (ethylene content: 4.5 wt %, MI: 1.0 g/10 min.; "Idemitsu Polypro E250G" produced by Idemitsu Petro-Chemical Co., Ltd.)
*26 Polyethylene (MI: more than 500 g/10 min.; density: 0.970 g/cm$^3$; "Polyethylene 400P" produced by Mitsui Petro-Chemical Co., Ltd.)

*1 Propylene-ethylene copolymer (ethylene content: 4 wt %, MI 8 g/10 min.; "Idemitsu Polypro J785H" produced by Idemitsu Petro-Chemical Col, Ltd.)

*2 Propylene homopolymer (MI: 20 g/10 min. ("Idemitsu Polypro J2000 G" produced by Idemitsu Petro-Chemical Co., Ltd.)

*3 Propylene-ethylene copolymer (ethylene content; 4 wt %, MI: 30 g/10 min.; "Idemitsu Polypro J3050H" produced by Idemitsu Petro-Chemical Co., Ltd.)

*4 Propylene-ethylene copolymer (ethylene content: 6.1 wt %, MI: 3 g/10 min.; "Idemitsu Polypro J450H" produced by Idemitsu Petro-Chemical Co., Ltd.)

*5 Propylene-ethylene copolymer (ethylene content: 11.1 wt %, MI: 2 g/10 min.; "Idemitsu Polypro J465H" produced by Idemitsu Petro-Chemical Co., Ltd.)

*6 High density polyethylene (MI: 18 g/10 min., density: 0.965 g/cm$^3$; "Idemitsu Polyethyl 130J" produced by Idemitsu Petro-Chemical Co., Ltd.)

*7 Ethylene-Butene-1 copolymer (MI: 40 g/10 min., density: 0.935 g/cm³; "Stamilex 4408" produced by DSM Co.)

*8 High density polyethylene (MI: 132 g/10 min., density: 0.957 g/cm³; "SCLAIR 2818" produced by Du Pont Canada Co.)

*9 High density polyethylene (MI: 0.2 g/10 min., density: 0.950 g/cm³; "Idemitsu Polyethy 550P" produced by Idemitsu Petro-Chemical Co., Ltd.)

*10 High density polyethylene (MI: 13 g/10 min., density: 0.965 g/cm³; "Idemitsu Polyethy 110J" produced by Idemitsu Petro-Chemical Co., Ltd.)

*11 Fibery magnesium oxysulfate (fiber diameter: 0.8 μm, aspect ratio: 40)

*12 Magnesium hydroxide fiber (fiber diameter: 0.5 μm, aspect ratio: 30)

*13 Magnesium oxide fiber (fiber diameter: 0.4 μm, aspect ratio: 40)

*14 Gypsum fiber (fiber diameter: 0.2 μm, aspect ratio: 50)

*15 Potassium titanate fiber (fiber diameter: 0.3 μm, aspect ratio: 40)

*16 Glass fiber (fiber diameter: 1.0 μm, aspect ratio: 50)

*17 Carbon fiber (fiber diameter: 0.9 μm, aspect ratio: 40)

*18 Silicon axide fiber (fiber diameter: 0.3 μm, aspect ratio: 60)

*19 Silicon carbide fiber (fiber diameter: 0.8 μm, aspect ratio: 40)

*20 Glass fiber (fiber diameter: 13 μm, aspect ratio: 250)

*21 Calcium silicate fiber (fiber diameter: 4 μm, aspect ratio: 10)

*22 Gypsum fiber (fiber diameter: 4 μm, aspect ratio: 30)

*23 Milled fiber (fiber diameter: 13 μm, aspect ratio: 5)

*24 Fibery magneisum oxysulfate (fiber diameter: 0.8 μm, aspect ratio: 5)

*25 Propylene-ethylene copoplymer (ethylene content: 4.5 wt %, MI: 1.0 g/10 min.; "Idemitsu Polypro E250G" produced by Idemitsu Petro-Chemical Co., Ltd.)

*26 Polyethylene (MI: more than 500 g/10 min., density: 0.970 g/cm³; "Polyethylene 400P" produced by Mitsui Petro-Chemical Co., Ltd.)

What is claimed is:

1. A polyolefin resin composition comprising polyolefin and an inorganic filler which comprises (A) 75-97% by weight of a polyolefin composition containing (a) 90-65 parts by weight of polymer composition comprising a crystalline polypropylene component and an ethylene-propylene random copolymer and having an ethylene content e more than 7% by weight and/or a propylene homopolymer and (b) 10-35 parts by weight of a polyethylene having a melt index of not lower than 10 g/10 minutes, said melt index being from 1.0 to 50 times as high as that of the component (a) and (B) 25-3% by weight of a fibrous inorganic filler having an average fiber diameter of 0.1-0.8 μm and an aspect ratio of 20-60.

2. A polyolefin composition as claimed in claim 1, wherein the component (a) is a propylene homopolymer.

3. A polyolefin composition as claimed in claim 1, wherein said fibrous inorganic filler is at least one member selected from the group consisting of a magnesium sulfate fiber, fibrous magnesium oxysulfate, a magnesium hydroxide fiber, a gypsum fiber, a potassium titanate fiber, a glass fiber, a calsium silicate fiber, a carbon fiber, rock wool, silicon azide whisker, a silicon carbide whisker, and a ceramic fiber.

4. A polyolefin composition as claimed in claim 1, wherein said fibrous inorganic filler is at least one member selected from the group consisting of a fibrous magnesium oxysulfate, a magnesium hydroxide fiber and gypsum fiber.

5. A polyolefin composition as claimed in claim 1, wherein said polyolefin composition contains a silane based coupling agent.

6. A polyolefin composition as claimed in claim 5, wherein said silane based coupling agent is contained in an amount of from 0.1 to 3 parts by weight per 100 part by weight of the sum of the component (A) and the component (B).

7. A polyolefin composition as claimed in claim 1, wherein said polyolefin composition contains a modified polyolefin.

8. A polyolefin composition as claimed in claim 7, wherein said modified polyolefin is contained in as amount of from 0.1 to 5 parts by weight per 100 part weight of the sum of the component (A) and the component (B).

9. A polyolefin composition as claimed in claim 1, wherein said polyolefin composition further contains at least one member selected from the group consisting of an antioxidant, an antistatic agent, an ultraviolet light absorbent, a lubricant, a flame retardant, a mould release agent and a coloring agent.

10. A polyolefin composition as claimed in claim 1, wherein said polyolefin composition is in the form of molded article for use in domestic electric appliances, office devices and automobiles.

* * * * *